US012680862B2

(12) United States Patent
Takata et al.

(10) Patent No.: US 12,680,862 B2
(45) Date of Patent: Jul. 14, 2026

(54) REMOVED ARTICLE STORAGE BOX AND ARTICLE INSPECTION SYSTEM

(71) Applicant: ANRITSU CORPORATION, Kanagawa (JP)

(72) Inventors: Osamu Takata, Kanagawa (JP); Shinya Waki, Kanagawa (JP); Jyunki Kawamata, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 361 days.

(21) Appl. No.: 18/507,531

(22) Filed: Nov. 13, 2023

(65) Prior Publication Data

US 2024/0183705 A1     Jun. 6, 2024

(30) Foreign Application Priority Data

Dec. 5, 2022     (JP) ................................. 2022-194130

(51) Int. Cl.
    *G01G 19/387*       (2006.01)
    *B65G 47/46*        (2006.01)
(52) U.S. Cl.
    CPC ........... *G01G 19/387* (2013.01); *B65G 47/46* (2013.01)
(58) Field of Classification Search
    CPC ..... G01G 19/387; B65G 47/46; B65G 47/766
    See application file for complete search history.

(56) References Cited

U.S. PATENT DOCUMENTS

| | | | | |
|---|---|---|---|---|
| 2007/0144792 A1* | 6/2007 | Hjalmarsson | ........ | G01G 19/393 |
| | | | | 177/25.18 |
| 2010/0101871 A1* | 4/2010 | Dale | .................... | G01G 15/006 |
| | | | | 177/1 |
| 2014/0249767 A1* | 9/2014 | Thomas | ............... | G01G 15/006 |
| | | | | 702/82 |

(Continued)

FOREIGN PATENT DOCUMENTS

| | | | | | |
|---|---|---|---|---|---|
| GB | 2107647 | A | * | 5/1983 | ............ B41F 33/025 |
| JP | 2002079186 | A | * | 3/2002 | |
| JP | 2008185540 | A | * | 8/2008 | |

(Continued)

OTHER PUBLICATIONS

Machine translation of JP-2002079186 from Espacenet (Year: 2002).*

*Primary Examiner* — Natalie Huls
(74) *Attorney, Agent, or Firm* — McDonald Hopkins LLC

(57)     ABSTRACT

A removed article storage box having a box-shaped body into which an article to be removed to an outside of a transport path due to a specific inspection result is input includes weight measuring unit for measuring a weight value of the article input into the box-shaped body and for measuring a first measurement value measured at a preset fixed cycle and a second measurement value measured at a time at which a predetermined time elapses after the removal, input determination unit for determining, based on the first and second measurement values, whether or not the article with the specific inspection result is input into the box-shaped body from the transport path within a predetermined time after the removal, and notification output unit for performing a notification output of a storage state of the article in the box-shaped body according to a determination result of the input determination unit.

11 Claims, 9 Drawing Sheets

(56)  References Cited

U.S. PATENT DOCUMENTS

| 2015/0246769 A1* | 9/2015 | Pearlson | ............. | F42B 33/0207 |
| | | | | 414/21 |
| 2020/0300689 A1* | 9/2020 | Hirani | .................. | B65G 41/006 |

FOREIGN PATENT DOCUMENTS

| JP | 5877628 B2 | 3/2016 | | |
| WO | WO-2022094307 A1 * | 5/2022 | ........... | B65G 47/917 |

* cited by examiner

Weight value measurement and sorting abnormality
notification at time of NG Determination Weight value measurement and sorting
abnormality notification at fixed cycle

REMOVED ARTICLE STORAGE BOX AND ARTICLE INSPECTION SYSTEM

TECHNICAL FIELD

The present invention relates to a removed article storage box and an article inspection system, and in particular to a removed article storage box into which, in a case where an inspected article with a specific inspection result is removed from an article transport path, the article to be removed is input and an article inspection system equipped with the box.

BACKGROUND ART

An article inspection system has been widely used in which articles such as foods or medicines are sequentially inspected by an article inspection machine while being transported in a predetermined direction and an NG article with a specific inspection result, for example, which is determined to be a defective article, is sorted by a sorting machine and is removed to an outside of system deviating from a transport path of another article, for example, an OK article determined to be non-defective.

In such an article inspection system, a reliable removal operation by the sorting machine is required to prevent the article to be removed (NG article) from flowing into the transport path of another article (OK article).

In the related art, there is a system in which an NG article removed from a transport path by a sorting machine is input into a removed article storage box outside the transport path.

As this type of removed article storage box and article inspection system, for example, a removed article storage box and an article inspection system are known in which a priority order for distributing removed articles is set in advance for inspection results of a plurality of inspection items, an NG article is removed in a distribution direction of the NG article decided according to the priority order and the inspection results of the plurality of inspection items, and an NG box for each distribution direction, which is disposed on a downstream side of the distribution direction, is caused to store the NG article, while displaying the number of quality determinations for the plurality of inspection items and displaying an integrated value of the number of times of the number of removals for each decided distribution direction.

In this article inspection system, the integrated value of the number of times is updated based on a timing at which NG articles are distributed in the decided distribution direction. Thus, there is an advantage that a numerical quantity of articles that have been distributed and removed according to the inspection results can be grasped from a display content on a display unit (for example, refer to Patent Document 1).

RELATED ART DOCUMENT

Patent Document

[Patent Document 1] Japanese Patent No. 5877628

DISCLOSURE OF THE INVENTION

Problem that the Invention is to Solve

However, even in the article inspection system in the related art described above, the number of articles to be actually removed in a case where the article inspection machine makes an NG determination (predetermined determination result) is not counted. Thus, numerical quantity display (NG number display) of the article determined as NG by the article inspection machine may not match the numerical quantity (number of pieces) of the removed article put into the removed article storage box (NG box) due to the inspection result of the NG determination.

Specifically, in a case where so-called double-loading occurs on a weighing platform of the article inspection machine that weighs a transported article due to, for example, an abnormality in transport, such as an early carrying in of any article preceding or succeeding the article in an inspection zone of the inspection during the article inspection or a delayed carrying out of the article from the inspection zone, the number of articles put into the NG box becomes greater than the number of NG articles for each inspection item on a display screen of the article inspection machine. Thus, the number of removed articles to be displayed may not match the number of stored articles.

In that case, in order to check the certainty of the number of articles in the NG box (whether the articles therein are reliably removed), a manager needs to interview a field worker to check an occurrence situation of the NG article and a storage situation of the removed article in the NG box, or to check a situation at the time of removal of the NG article from a video of the NG article captured by a camera, which requires the time and effort for the situation check work at the time of the NG occurrence.

Further, for example, in a case where a malfunction of the sorting machine occurs due to a setting adjustment mistake or a failure, or in a case where a work mistake occurs, such as accidental returning of the removed article that has been removed from the storage box to a non-defective article passing side by a field worker for some reason, the number of NG articles does not match the number of articles in the NG box. Thus, there is a concern that reliable removal of the NG article to the outside of system cannot be guaranteed.

Furthermore, a mechanism can be considered such as a sorting checking function of detecting the NG article, which is a removal target article, according to the inspection result by using a sensor such as a light emitter/receiver or a camera to prevent the NG article from passing through the non-defective article passing side. However, there is a concern that the sensor may not be able to detect the NG article depending on a flow type of a product or a system setting, and it is necessary to check the NG article with the video after the event in the case of using the camera. Thus, immediate action cannot be taken.

The present invention has been made in order to solve this problem, and an object of the present invention is to provide a removed article storage box that stores an article removed from an article inspection line to an outside of system and always monitors a stored numerical quantity of the article such that information can be output accurately and to provide an article inspection system that is equipped with an article inspection machine and the removed article storage box and is capable of always accurately grasping the numerical quantity of the article stored in the removed article storage box and a change in the numerical quantity of the article.

Means for Solving the Problem

In order to achieve the above object, a removed article storage box according to a first aspect of the present invention is a removed article storage box having a box-shaped body with a bottom inside the removed article storage box, in which, in a case where an article on a transport path with a specific inspection result is removed to an outside of the transport path, the article to be removed is input into the box-shaped body, the removed article storage box including weight measuring means for measuring a weight value of the article input into the box-shaped body and for measuring a first measurement value measured at a preset fixed cycle and a second measurement value measured at a time at which a predetermined time elapses after the article with the specific inspection result is removed to the outside of the transport path, input determination means for determining, based on the first measurement value and the second measurement value, whether or not the article with the specific inspection result is input into the box-shaped body from the transport path within a predetermined time after the removal, and notification output means for performing a notification output of a storage state of the article in the box-shaped body according to a determination result of the input determination means.

In the removed article storage box according to the first aspect of the present invention, the weight value of the article stored in the box-shaped body is measured as the first measurement value at the fixed cycle, which means that the weight value thereof is substantially always monitored, and in a case where the inspection result is the specific inspection result and the removal is necessary, it is possible to determine whether or not the article with the specific inspection result is input into the box-shaped body within the predetermined time after the distribution/removal operation based on a request to remove the article with comparison of the second measurement value at the time at which the predetermined time elapses after the distribution/removal with the first measurement value before the removal request is generated. Therefore, the determination is accurately made, based on the first and second measurement values, whether or not the article with the specific inspection result is input into the box-shaped body from the transport path within the predetermined time after the distribution/removal. As a result, in the removed article storage box of the present invention, it is possible to store, inside the removed article storage box, the article removed to the outside of system from the article inspection line, and to monitor the change in the stored numerical quantity of the article such that notification can be output accurately.

A removed article storage box according to a second aspect of the present invention is a removed article storage box having a box-shaped body with a bottom inside the removed article storage box, in which, in a case where an article on a transport path with a specific inspection result is removed to an outside of the transport path, the article to be removed is input into the box-shaped body, the removed article storage box including weight measuring means for measuring a weight value of the article input into the box-shaped body and for measuring a first measurement value measured at a preset fixed cycle, input determination means for determining, based on the first measurement value, whether or not the article with the specific inspection result is input into the box-shaped body from the transport path within a predetermined time after the removal, and notification output means for performing a notification output of a storage state of the article in the box-shaped body according to a determination result of the input determination means.

In the removed article storage box according to the second aspect of the present invention, the input determination means makes the determination based only on the first measurement value, unlike the removed article storage box according to the first aspect. This means that there is a case where the time at which the predetermined time elapses to measure the second measurement value is a timing that accidentally coincides with a time of the measurement at the fixed cycle at which the first measurement value is measured and further, a measurement value, among the measurement values of the first measurement value at the fixed cycle, immediately after the article with the specific inspection result is removed to the outside of the transport path may be used as the second measurement value (in that case, the predetermined value referred to in the present invention is a time equal to or less than a fixed time, which corresponds to the fixed cycle).

The removed article storage box according to a third aspect of the present invention, in the removed article storage box according to the first aspect, may be configured to further include number calculation means for calculating, based on the first measurement value and the second measurement value, the number of articles in the box-shaped body.

Further, the removed article storage box according to a fourth aspect of the present invention, in the removed article storage box according to the second aspect, may be configured to further include number calculation means for calculating, based on the first measurement value, the number of articles in the box-shaped body.

The removed article storage box according to a fifth aspect of the present invention is the removed article storage box according to the first aspect, in which the notification output means may be configured to output, to an external device or an external system capable of performing a notification output, abnormality notification information that is notification information indicating an abnormality occurrence in which the article with the specific inspection result is not input into the box-shaped body within the indicating an abnormality occurrence in which an article without the specific inspection result is input into the box-shaped body, and/or notification information corresponding to the number of input articles.

Preferably, for example, in a case where a removal mistake has occurred in which the weight value of the stored article in the corresponding NG box does not increase even though control of removing the article with the inspection result of NG (hereinafter referred to as NG article) to the outside of the transport path is performed, or in a case where an abnormality mistake has occurred in which the weight value of the stored article in the removed article storage box increases even though control of not removing the article with the inspection result of OK (hereinafter referred to as OK article) to the outside of the transport path is performed, an abnormality determination notification (also referred to as abnormality notification information) may be issued from the notification output means of the removed article storage box. Further, it is possible to output the notification information corresponding to the number of articles input and stored in the box-shaped body at any timing or cycle, regardless of whether or not the abnormality determination notification is issued. The removal mistake or other abnormalities may also occur in a case where the removed article is manually taken out of the removed article storage box by a worker for some reason. However, even in such a case, it is possible to issue the abnormality determination notification from the notification output means. Further, in a case where there is provided a locking-type opening/closing door (a lid located above the transport path may also be used) that can be opened in a case where the removed articles accumulated in the removed article storage box are taken out, a fluctuation (decrease) in the weight value due to the taking out of the removed articles under a state where the opening/closing door is unlocked and opened is not abnormal. Therefore, it is also possible to prevent the abnormality determination notification from being issued from the notification output means under such a state.

The removed article storage box according to a sixth aspect of the present invention is the removed article storage box according to the second aspect, in which the notification output means may be configured to output, to an external device or an external system capable of performing a notification output, abnormality notification information that is notification information indicating an abnormality occurrence in which the article with the specific inspection result is not input into the box-shaped body within the indicating an abnormality occurrence in which an article without the specific inspection result is input into the box-shaped body, and/or notification information corresponding to the number of input articles.

Preferably, for example, in a case where a removal mistake has occurred in which the weight value of the stored article in the corresponding NG box does not increase even though control of removing the article with the inspection result of NG (hereinafter referred to as NG article) to the outside of the transport path is performed, or in a case where an abnormality mistake has occurred in which the weight value of the stored article in the removed article storage box increases even though control of not removing the article with the inspection result of OK (hereinafter referred to as OK article) to the outside of the transport path is performed, an abnormality determination notification may be issued from the notification output means of the removed article storage box. Further, it is possible to output the notification information corresponding to the number of articles input and stored in the box-shaped body at any timing or cycle, regardless of whether or not the abnormality determination notification is issued. The removal mistake or other abnormalities may also occur in a case where the removed article is manually taken out of the removed article storage box by a worker for some reason. However, even in such a case, it is possible to issue the abnormality determination notification from the notification output means. Further, in a case where there is provided a locking-type opening/closing door (a lid located above the transport path may also be used) that can be opened in a case where the removed articles accumulated in the removed article storage box are taken out, a fluctuation (decrease) in the weight value due to the taking out of the removed articles under a state where the opening/closing door is unlocked and opened is not abnormal. Therefore, it is also possible to prevent the abnormality determination notification from being issued from the notification output means under such a state.

The removed article storage box according to a seventh aspect of the present invention is the removed article storage box according to the first aspect, in which the specific inspection result may be an inspection result determined to be defective for a preset inspection item, and the article with the specific inspection result may be configured to be removed to the outside of the transport path as a defective article to be removed and to be input into the box-shaped body.

Further, the removed article storage box according to an eighth aspect of the present invention is the removed article storage box according to the second aspect, in which the specific inspection result may be an inspection result determined to be defective for a preset inspection item, and the article with the specific inspection result may be configured to be removed to the outside of the transport path as a defective article to be removed and to be input into the box-shaped body.

An article inspection system according to a ninth aspect of the present invention includes an article inspection machine that inspects an article on a transport path for a predetermined inspection item, a removal device that removes, in a case where an inspection result of the article inspection machine is a specific inspection result, an inspected article to an outside of the transport path as an article to be removed, and the removed article storage box according to the first aspect that stores the article removed to the outside of the transport path by the removal device.

Therefore, in the article inspection system according to the ninth aspect of the present invention, it is possible to store, inside the removed article storage box, the article removed to the outside of system from the article inspection line, and to monitor the change in the stored numerical quantity of the article such that notification can be output accurately. As a result, it is possible to reliably match the output information of the inspection results of the article inspection machine with the change in the stored numerical quantity of the removed article in the removed article storage box.

An article inspection system according to a tenth aspect of the present invention includes an article inspection machine that inspects an article on a transport path for a predetermined inspection item, a removal device that removes, in a case where an inspection result of the article inspection machine is a specific inspection result, an inspected article to an outside of the transport path as an article to be removed, and the removed article storage box according to the second aspect that stores the article removed to the outside of the transport path by the removal device.

Therefore, in the article inspection system according to the tenth aspect of the present invention, it is possible to store, inside the removed article storage box, the article removed to the outside of system from the article inspection line, and to monitor the change in the stored numerical quantity of the article such that notification can be output accurately. As a result, it is possible to reliably match the output information of the inspection results of the article inspection machine with the change in the stored numerical quantity of the removed article in the removed article storage box.

The article inspection system according to an eleventh aspect of the present invention is the article inspection system according to the ninth aspect, in which the weight measuring means of the removed article storage box may be configured to measure the second measurement value at a time at which a predetermined time is elapsed after the article is removed to the outside of the transport path by the removal device and until a measurement timing of the first measurement value at the fixed cycle is reached.

The article inspection system according to a twelfth aspect of the present invention is the article inspection system according to the ninth aspect, in which the removed article storage box may be further provided with number calculation means for calculating, based on the first measurement value and the second measurement value, the number of articles in the box-shaped body.

Further, the article inspection system according to a thirteenth aspect of the present invention is the article inspection system according to the tenth aspect, in which the removed article storage box may be further provided with number calculation means for calculating, based on the first measurement value, the number of articles in the box-shaped body.

The article inspection system according to a fourteenth aspect of the present invention is the article inspection system according to the ninth aspect, in which the notification output means of the removed article storage box may be configured to output, to an external device or an external system capable of performing a notification output, abnormality notification information that is notification information indicating an abnormality occurrence in which the article with the specific inspection result is not input into the box-shaped body within the predetermined time and/or is notification information indicating an abnormality occurrence in which an article without the specific inspection result is input into the box-shaped body, and/or notification information corresponding to the number of input articles.

Further, the article inspection system according to a fifteenth aspect of the present invention is the article inspection system according to the tenth aspect, in which the notification output means of the removed article storage box may be configured to output, to an external device or an external system capable of performing a notification output, abnormality notification information that is notification information indicating an abnormality occurrence in which the article with the specific inspection result is not input into the box-shaped body within the predetermined time and/or is notification information indicating an abnormality occurrence in which an article without the specific inspection result is input into the box-shaped body, and/or notification information corresponding to the number of input articles.

The removed article storage box according to a sixteenth aspect of the present invention is the removed article storage box according to the first aspect, in which, in a case where a measurement timing of the first measurement value matches a measurement timing of the second measurement value, the first measurement value with which the measurement timings match may be used as the second measurement value. Accordingly, the determination is accurately made, based only on the first measurement value, whether or not the article with the specific inspection result is input into the box-shaped body from the transport path within the predetermined time after the distribution/removal.

Advantage of the Invention

According to the present invention, it is possible to provide the removed article storage box that stores the article removed from the article inspection line to the outside of system and monitors the stored numerical quantity of the article or a change in the numerical quantity such that information can be output accurately and provide the article inspection system that is provided with the article inspection machine and the removed article storage box thereof and can accurately grasp the numerical quantity of the removed article stored in the removed article storage box and the change in the numerical quantity thereof.

BEST MODE FOR CARRYING OUT THE INVENTION

Hereinafter, embodiments according to the present invention will be described with reference to the drawings.

FIGS. 1 to 8 show an article inspection system equipped with a removed article storage box according to an embodiment of the present invention.

First, a configuration thereof will be described.

Figure 1:
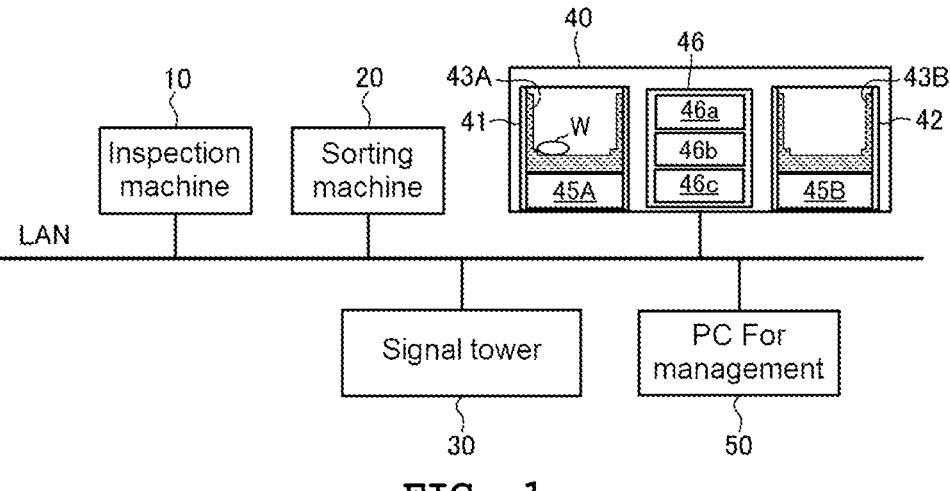
FIG. 1 is a schematic network configuration diagram of an article inspection system according to an embodiment of the present invention, which includes a removed article storage box as an NG box.

In an article inspection system 1 of the present embodiment shown in FIGS. 1 to 3, a plurality of conveyor transport paths 2, 3, 4, and 5 are disposed in order in a direction of an arrow D0 (hereinafter referred to as article transport direction D0) in FIG. 3A, which is an article transport direction, to transport a predetermined article W in a sequentially transferable manner. The plurality of conveyor transport paths constitute an article inspection line in which a predetermined article inspection by an article inspection machine 10 (article inspection machine) for each article W to be transported and a distribution/removal operation by a sorting machine 20 according to an inspection result of the predetermined article inspection are executed. The predetermined article W referred to herein does not necessarily have to be a regular shape, but is a food or a medicine that is weighed to have a substantially constant mass and is packaged in a countable manner or stored in a container, for example, a packaged rice ball.

Figure 2:
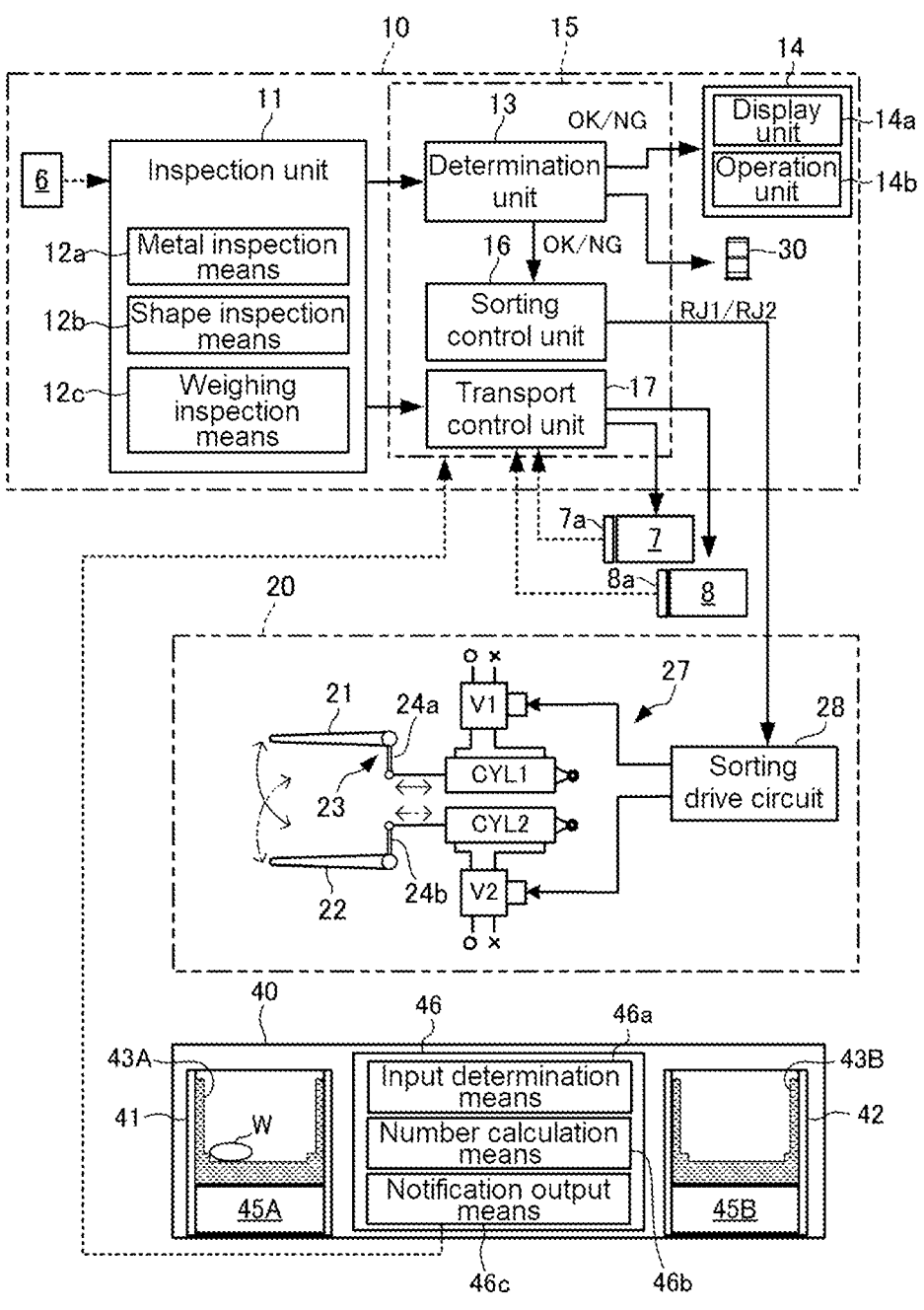
FIG. 2 is a schematic configuration diagram of an article inspection machine and a sorting machine in the article inspection system according to an embodiment of the present invention.

The conveyor transport path 3 corresponding to an inspection zone of the article inspection machine 10 and the conveyor transport path 4 corresponding to a distribution/removal zone by the sorting machine 20 are configured of belt conveyors that are driven by a plurality of transport drive motors 7 and 8 shown in FIG. 2 to be able to drive rotation of endless transport belts in the transport direction, and each of the transport drive motors 7 and 8 is mounted with a rotary encoder for speed detection. The conveyor transport path 2 at a front stage and the conveyor transport path 5 at a rear stage are driven at the same transport speed as the conveyor transport paths 3 and 4, but may be accelerated or decelerated between adjacent conveyors. A compatible transport drive motor is provided for each conveyor transport path.

An article detection sensor 6 such as a photoelectric sensor is provided between the conveyor transport path 2 at the front stage and the conveyor transport path 3 on a side of the article inspection machine 10. In a case where the article detection sensor 6 is shielded from light due to the article W carried into an inspection zone Z1 corresponding to the conveyor transport path 3, an article detection signal is output.

The article inspection machine 10 has an inspection unit 11 that executes the article inspection of a predetermined method for a plurality of inspection items, a determination unit 13 that determines a result of the article inspection of each article W based on an output signal of the inspection unit 11, and an operation display unit 14 that outputs a determination result of the unit 13 on a screen.

The inspection unit 11 is provided with, for example, metal inspection means 12a, shape inspection means 12b, and weighing inspection means 12c, each having an inspection mechanism and an inspection control circuit corresponding to the inspection item, and the predetermined article inspection for the plurality of inspection items are executed while the article W passes through an article inspection zone corresponding to a length of the conveyor transport path 3.

Specifically, for example, the metal inspection means 12a detects a fluctuation in a magnetic field in a case where the article W passes through an inspection space of the inspection mechanism, which generates the magnetic field, and processes a detection signal thereof in the inspection control circuit to inspect the presence or absence of metal contamination.

The shape inspection means 12b inputs an X-ray image from the inspection mechanism that captures an X-ray transmission image of the article W to be transported into the inspection control circuit and generates an image that is gradated based on an X-ray transmission brightness thereof, for example, a binarized image to inspect quality of a shape of the article W, such as a crack or a fragmentation.

The weighing inspection means 12c applies a known low-pass filter to a weighing signal waveform of the article W generated by sequentially inputting the output signals from the inspection mechanism having a weighing (measuring) sensor into the inspection control circuit to calculate a weighing value obtained by removing a noise component in the weighing signal, and inspects whether at least a weight of the article W is within an allowable range.

Figure 3A:
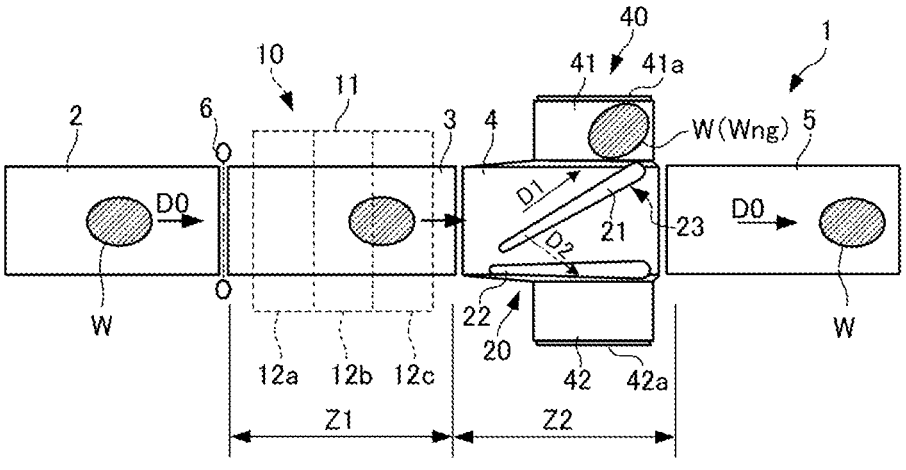
FIG. 3A is a schematic plan view of main parts showing a general line configuration of the article inspection system according to an embodiment of the present invention.
Figure 3B:
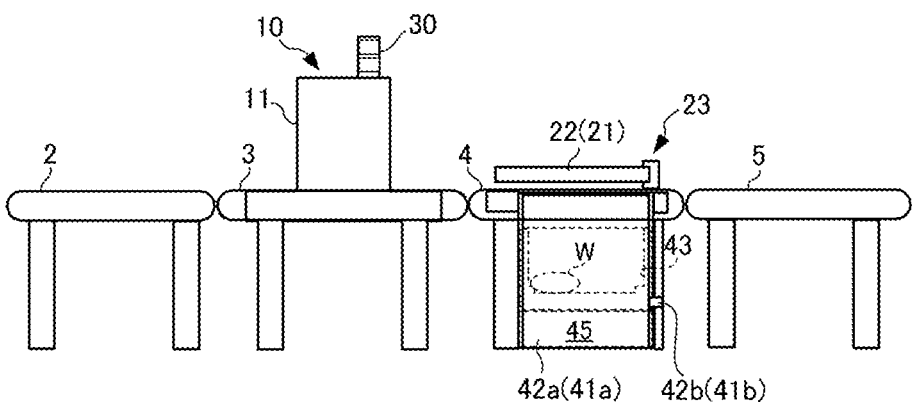
FIG. 3B is a schematic front view of main parts of the same article inspection system.

For convenience of illustration, in FIG. 3A, the metal inspection means 12a, the shape inspection means 12b, and the weighing inspection means 12c are illustrated adjacent to each other in the DO direction, which is the article transport direction. A form of disposing the plurality of pieces of inspection means in the inspection unit 11 is various, and it goes without saying that the plurality of pieces of inspection means may be provided together in the same zone in the transport direction.

The determination unit 13 has a memory that stores inspection outputs from the metal inspection means 12a, the shape inspection means 12b, and the weighing inspection means 12c, a processor that executes an inspection program for determining the inspection result based on a determination criterion for each inspection item, or the like, and executes, based on a preset priority order of the inspection result, a pass/fail determination for each article W based on the inspection results of the necessary number of inspection items. Further, the determination unit 13 outputs inspection result information to the operation display unit 14 and changes a lighting state of a signal tower 30 mounted on the article inspection machine 10 according to a pass/fail determination result.

The operation display unit 14 has a display unit 14a that is configured of, for example, a touch panel and displays and outputs a test result screen based on determination result information from the determination unit 13 and an operation unit 14b that allows a user to input setting or the like while referring to the screen.

Although a specific hardware configuration of the article inspection machine 10 is not shown, the respective inspection control circuits of the metal inspection means 12a, shape inspection means 12b, and weighing inspection means 12c of the inspection unit 11 and the determination unit 13 are configured of a controller 15 including, for example, a programmable logic controller (PLC).

Specifically, the controller 15 has various memories that store programs such as a predetermined transport control program, an inspection determination program, and a sorting control program and information, a calculation control unit that executes the program, an input unit that inputs information from the outside, an output unit that outputs a calculation result to the outside, a power supply unit, and a communication port.

In addition exerting the function of the determination unit 13, the controller 15 can exert a function of the sorting control unit 16 of generating and outputting, based on a time of entry detection by the article detection sensor 6, a sorting command signal RJ1 or RJ2 for causing any one of a pair of sorting arms 21 and 22 of the sorting machine 20 to selectively swing on the conveyor transport path 4 according to a quality determination result (OK/NG) of each article W by the determination unit 13, a function of the transport control unit 17 of controlling at least the transport drive motors 7 and 8 of the conveyor transport paths 3 and 4, and a lighting control function of the signal tower 30.

The sorting command signal RJ1 is a command to cause one sorting arm 21 to swing counterclockwise in FIG. 3A to intersect with the article transport direction such that a path of the article W to be sorted is distributed from the direction of the arrow D0 in FIG. 3A to a direction of an arrow D1 (hereinafter referred to as distribution direction D1), which deviates on an upper side (one side) in FIG. 3A, and to cause the article W to be stored in a first NG box (one removed article storage box) 41 of the removed article storage unit 40 attached to the sorting machine 20. Further, the sorting command signal RJ2 is a command to cause the other sorting arm 22 to swing clockwise in FIG. 3A to intersect with the article transport direction such that the path of the article W to be sorted is distributed from the direction of the arrow D0 in FIG. 3A to a direction of an arrow D2 (hereinafter referred to as distribution direction D2), which deviates on a down side (the other side) in FIG. 3A, and to cause the article W to be stored in a second NG box (the other removed article storage box) 42 of the removed article storage unit 40.

The controller 15 is connected to a PC for management 50 via a LAN using a predetermined communication method, and is capable mutually of transmitting and receiving inspection-related information and various control signals to and from the PC for management 50. The LAN referred to herein is configured of, for example, an Ethernet-based field bus, and can perform digital communication between controllers (communication for control information exchange in a lower layer, monitoring of an operation situation of the lower layer by an upper layer and an event in each device, and the like). Further, the controller 15 may include a tablet-type information terminal that functions as a programming tool or a setting input switch in cooperation with the PC for management 50.

The sorting machine 20 causes, in a case where any one of the sorting command signal RJ1 or RJ2 is not output from the sorting control unit 16, the articles W on the conveyor transport path 4 to proceed straight in the article transport direction D0 in FIG. 3A and causes, in a case where the sorting command signal RJ1 or RJ2 is selectively output from the sorting control unit 16, any one of the pair of sorting arms 21 and 22 to selectively swing on the conveyor transport path 4 according to the sorting command signal RJ1 or RJ2 to direct the distribution direction of the article W in the distribution direction D1 or D2, which is the direction of the arrow D1 or D2 in FIG. 3A.

The sorting machine 20 is configured to include a distribution mechanism 23 that swingably supports the pair of sorting arms 21 and 22 extending in the article transport direction on both sides of the conveyor transport path 4 at each one end portion on a downstream side, a drive mechanism 27 that is configured of levers 24a and 24b for driving the distribution mechanism 23, air cylinders CYL1 and CYL2 (fluid pressure operated actuators), cylinder control valves V1 and V2 (fluid supply/discharge and direction control valves), and the like, and a sorting drive circuit 28 that causes, in a case where any one of the sorting command signal RJ1 or RJ2 is input, the drive mechanism 27 to operate in response to the input of the sorting command signal RJ1 or RJ2. The ○ marks in FIG. 2 schematically indicate air supply pressure ports of the cylinder control valves V1 and V2, and the x marks schematically indicate atmosphere release ports.

The signal tower 30 has, for example, an LED unit, a blinking unit, and a buzzer unit, and the controller 15 controls the signal tower 30, according to the inspection result of an article to be inspected by the article inspection machine 10 and the success or failure of the distribution/removal operation by the sorting machine 20, such that the signal tower 30 is controlled to be in a lighting display state and a state of outputting notification sound or ringing according to the result are in an output state.

The first NG box 41 and the second NG box 42 of the removed article storage unit 40 have box-shaped bodies 43A and 43B with bottoms, respectively. In a case where the article W on the conveyor transport path 4 with the article inspection result by the article inspection machine 10 of a specific inspection result, for example, an article Wng determined as NG is removed outside the conveyor transport path 4, the article Wng to be removed (refer to FIG. 3A) is input into any one of the box-shaped body 43A or 43B.

Further, the first NG box 41 and the second NG box 42 are provided with weight measuring devices 45A and 45B located below the box-shaped bodies 43A and 43B and a notification output unit 46 that operates based on measurement outputs from the weight measuring devices 45A and 45B. Furthermore, these first and second NG boxes 41 and 42 respectively have opening/closing doors 41a and 42a that are normally in a closed state covering the respective box-shaped bodies 43A, 43B and weight measuring devices 45A, 45B from the outside and are opened to the outside by the user in a case of taking out the removed articles from the box-shaped bodies 43A and 43B, and opening/closing detection sensors 41b, 42b that detect opening/closing of each of the opening/closing doors 41a, 42a.

Each of the weight measuring devices 45A and 45B is weight measuring means for incorporating a load sensor that receives the weight (downward load) from the corresponding box-shaped body 43A or 43B and a measurement circuit that subtracts the weight of the corresponding box-shaped body 43A or 43B, as a tare load, from the output of each load sensor to calculate a weight value of the article W stored inside each box-shaped body 43A or 43B.

Each of the weight measuring devices 45A and 45B measures, as a first measurement value, the weight value of the article W input and stored inside each box-shaped body 43A or 43B at a preset fixed cycle (a fixed time shorter than an article transport interval, for example, several hundreds of milliseconds to several hundreds of seconds) and measures, as a second measurement value, the weight value of the article W at a time at which a predetermined time is elapsed until completion of sorting and removal after the article Wng has the specific inspection result (for example, NG determination) or after the removal operation of the sorting machine 20 is started [for example, immediately after the sorting arm 21 or 22 has completed the distribution operation in the direction of the arrow D1 or the direction of the arrow D2 in a tilted posture during distribution in which the sorting arm 21 or 22 is caused to swing at a predetermined angle on the conveyor transport path 4, or immediately after a start of a return operation from the tilted posture during distribution to a home position (normal standby posture that allows non-defective article passing) on a side-edge side of the conveyor transport path 4 (for example, several tens of milliseconds or several hundreds of milliseconds have elapsed from a point in time of estimating the completion of the distribution operation or a point in time of starting the return operation)].

The notification output unit 46 is provided with input determination means 46a for determining, based on at least the first measurement value of the first measurement value or the second measurement value from the weight measuring devices 45A and 45B, whether or not the article W with the specific inspection result is input into the box-shaped body 43A or 43B of the weight measuring device 45A or 45B from the conveyor transport path 4 within the predetermined time, and notification output means 46c for performing a notification output of the storage state of the article W in the box-shaped body 43A or 43B of each NG box 41 or 42 according to the determination result of the input determination means 46a.

The storage state of the article W in the box-shaped body 43A or 43B referred to herein includes not only a case where the notification output of, for example, the fact that the article Wng determined as NG is input into the corresponding box-shaped body 43A or 43B within the predetermined time after the distribution/removal operation thereof is performed based on a change (increase in weight value) in a storage amount in the box-shaped body 43A or 43B, but also a case where the notification output of the fact that the article Wng determined as NG is not input into the corresponding box-shaped body 43A or 43B within the predetermined time after the distribution/removal operation thereof is performed based on the fact that there is no change in the storage amount in the box-shaped body 43A or 43B. Further, the notification output referred to herein may include a signal output for performing the notification output via an external display device, audio output device, alarm device, ringing device, or the like.

The fact that the input determination means 46*a* of the notification output unit 46 makes the determination based on at least the first measurement value of the first measurement value or the second measurement value means that the time at which the predetermined time elapses to measure the second measurement value may be a timing that accidentally coincides with a time of the measurement at the fixed cycle at which the first measurement value is measured. Further, in the present embodiment, the second measurement value is exclusively measured at a time different from the measurement time at the fixed cycle in which the first measurement value is measured. This also means that a measurement value, among the measurement values of the first measurement value at the fixed cycle, immediately after the article W with the specific inspection result is removed outside the conveyor transport path 4 may be used as the second measurement value. In the latter case, the predetermined time is a time equal to or shorter than a fixed time corresponding to the fixed cycle, and may change within a range from a point in time at which the article W with the specific inspection result is removed outside the conveyor transport path 4 to a next measurement time of the first measurement value. In the present embodiment, the time at which the predetermined time elapses to measure the second measurement value is a time from a time of the measurement immediately before the article W with the specific inspection result is removed outside the conveyor transport path 4, among times of the measurement at the fixed cycle in which the first measurement value is measured, to a next time of the measurement. Thus, the time at which the predetermined time elapses to measure the second measurement value becomes an early measurement timing as compared with the latter case, except for a case where the time at which the predetermined time elapses to measure the second measurement value accidentally coincides with the time of the measurement at the fixed cycle at which the first measurement value is measured. Of course, the time at which the predetermined time elapses to measure the second measurement value can be set early to be the time from the time of the measurement immediately before the article with the specific inspection result is removed outside the transport path, among the times of the measurement at the fixed cycle in which the first measurement value is measured, to the next time of the measurement. In this case, the input determination means can make a quick determination based on the first measurement value and the second measurement value.

The notification output unit 46 is further provided with number calculation means 46*b* for calculating, in a case where the article W with the specific inspection result is input into the box-shaped body 43A or 43B within the predetermined time after the distribution/removal operation, the number of input articles W and the total number of articles stored in the box-shaped body 43A or 43B, based on at least the first measurement value of the first measurement value or the second measurement value from the weight measuring devices 45A and 45B. The notification output means 46*c* of the notification output unit 46 outputs, to the article inspection machine 10 or the PC for management 50 that is an external device or an external system capable of performing the notification output, notification information indicating the occurrence of an abnormality in which the article W with the specific inspection result is not input into the box-shaped body 43A or 43B within the predetermined time after the distribution/removal, and/or notification information corresponding to the number of input articles W.

Furthermore, the specific inspection result is set as the inspection result determined to be defective for a preset inspection item, and the article W with the specific inspection result is removed outside the conveyor transport path 4 as a defective removal target article Wng and is input into the box-shaped body 43A or 43B.

The PC for management 50 has, for example, a CPU being a processor with a built-in cache memory, a RAM, a ROM, an input/output interface circuit, a storage device such as an SSD and an HDD, a plurality of control programs and various types of setting information (including control parameter) stored in the ROM or the storage device, and the like. The CPU executes a predetermined control program based on various types of sensor information, the setting information, and the like to exert a predetermined function required for production management.

For example, the PC for management 50 executes a program for inspection result monitoring that can sequentially receive the inspection-related information representing the inspection results of the plurality of types of article inspection means 12*a* to 12*c* to function as a data recording unit that stores the received inspection data in a storage medium, and executes an analysis program that performs various types of analysis in combination with various types of information output from the controller 15 and a program that creates a report based on the analysis result.

As described above, the article inspection system 1 of the present embodiment is provided with the article inspection machine 10 that inspects the article W on the conveyor transport path 3 in the inspection zone Z1 for a plurality of predetermined inspection items, the sorting machine 20 serves as a removal device that removes, in a case where the inspection results of the article inspection machine 10 is the specific inspection result, an inspected article W, as an article to be removed, outside the conveyor transport path 4, and the removed article storage unit 40 that stores the articles Wng removed outside the conveyor transport path 4 by the sorting machine 20.

Further, the specific inspection result is a case where the article is determined to be defective for the preset inspection item, and the article W determined to be defective is removed, as an removal target article Wng, outside the conveyor transport path 4 (outside system) by the sorting arm 21 or 22 of the sorting machine 20 and is input into the first or second NG box 41 or 42 of the removed article storage unit 40.

In the case of the defective determination, in removing the article Wng to be removed outside the conveyor transport path 4, any one of the weight measuring device 45A or 45B of the NG box 41 or 42, in the removed article storage unit 40, located in a distribution/removal direction measures the second measurement value, at a point in time at which the predetermined time is elapsed after the distribution/removal of the article Wng by the sorting machine 20 or at a time from the elapsed point in time until a measurement timing of the first measurement value at a next fixed cycle is reached.

Further, the number calculation means 46*b* of the notification output unit 46 stores the measured second measurement value in the memory as the latest second measurement value, calculates an increased amount (=second measurement value–first measurement value) of the weight value from the first measurement value (hereinafter referred to as immediately preceding first measurement value), which is measured at the fixed-cycle measurement immediately before the measurement of the latest second measurement value and is stored in the memory, to the latest second measurement value, and calculates the number of articles (=increased amount/article mass setting value) newly input into the box-shaped body 43A or 43B based on a calculated value of the increased amount.

Furthermore, the input determination means 46*a* of the notification output unit 46 compares the latest second measurement value with the first measurement value (hereinafter referred to as immediately preceding first measurement value), which is measured at the fixed-cycle measurement immediately before the measurement thereof and is stored in the memory, or compares the increased amount of the weight value to the measurement value of the latest second measurement value with the weight value set for the article W to determine whether or not the article Wng to be removed is input into the box-shaped body 43A or 43B at a point in time at which the predetermined time elapses after the distribution/removal by the sorting machine 20.

In a case where the input determination means 46*a* of the notification output unit 46 determines that the article Wng to be removed is input into the box-shaped body 43A or 43B at the point in time at which the predetermined time elapses after the distribution/removal by the sorting machine 20, the notification output means 46*c* of the notification output unit 46 outputs, to the controller 15 and the PC for management 50, the increased amount of the weight value to the latest second measurement value and the number of newly input articles W.

On the other hand, in a case where the input determination means 46*a* of the notification output unit 46 determines that the article Wng to be removed is not input into the box-shaped body 43A or 43B at the point in time at which the predetermined time elapses after the distribution/removal by the sorting machine 20, the notification output means 46*c* of the notification output unit 46 outputs, to the controller 15 and the PC for management 50, a notification indicating that a sorting abnormality has occurred.

Next, operations will be described.

FIGS. 4 to 8 show a plurality of pieces of processing that are executed to be able to grasp a numerical quantity of the article W removed from the article inspection line to the outside of system as a stored numerical quantity in the NG boxes 41 and 42 for each distribution/removal direction according to the inspection result, in the article inspection system 1 of the present embodiment.

Specifically, the controller 15 of the article inspection machine 10 and the PC for management 50 cooperate to execute initial setting processing (refer to FIG. 4) prior to an operation of the article inspection system 1, mass setting processing (refer to FIG. 5) before an operation of a production system including the article inspection system 1, storage state monitoring processing (refer to FIG. 6) in the removed article storage box at the fixed cycle during production, input amount detection processing (refer to FIG. 7) at the time of NG determination, and report creation processing (refer to FIG. 8) after production.

Figure 4:
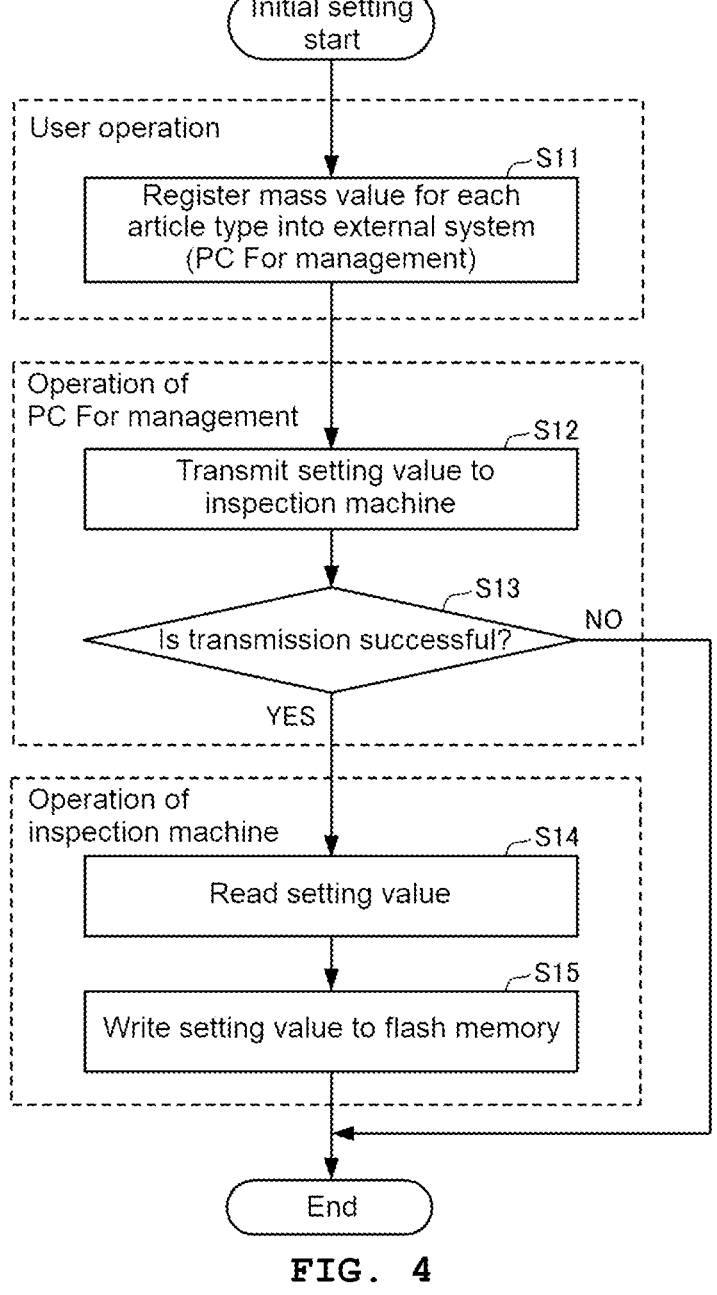
FIG. 4 is a flowchart showing a general processing procedure at the time of initial setting of a PC for management and the article inspection machine in the article inspection system according to an embodiment of the present invention.

In the initial setting processing shown in FIG. 4, first, the user performs an input operation to register a mass value (standard value and allowable error, or upper limit value and lower limit value) of a single article for each article type into an external system, for example, in the PC for management 50 (step S11). This input operation may be performed by a manual input for each article type, or may be performed by an input of mass value data prepared in advance for a plurality of article types.

Next, with the operation of the PC for management 50, the mass value of the article for each article type is transmitted to the article inspection machine 10 (denoted as "inspection machine" in FIGS. 4 to 8) (step S12), and whether or not the transmission is successful is checked by digital communication between the PC for management 50 and the article inspection machine 10 (step S13).

In a case where the transmission is successful (YES in step S13), the article inspection machine 10 operates to read the mass value of the article for each article type (step S14), and the read mass value is written to a memory forming a storage area for the setting value of the mass value, for example, a flash memory (step S15).

On the other hand, in a case where the mass value is not successfully transmitted to the article inspection machine 10 within the predetermined time (NO in step S13), the current processing ends.

Figure 5:
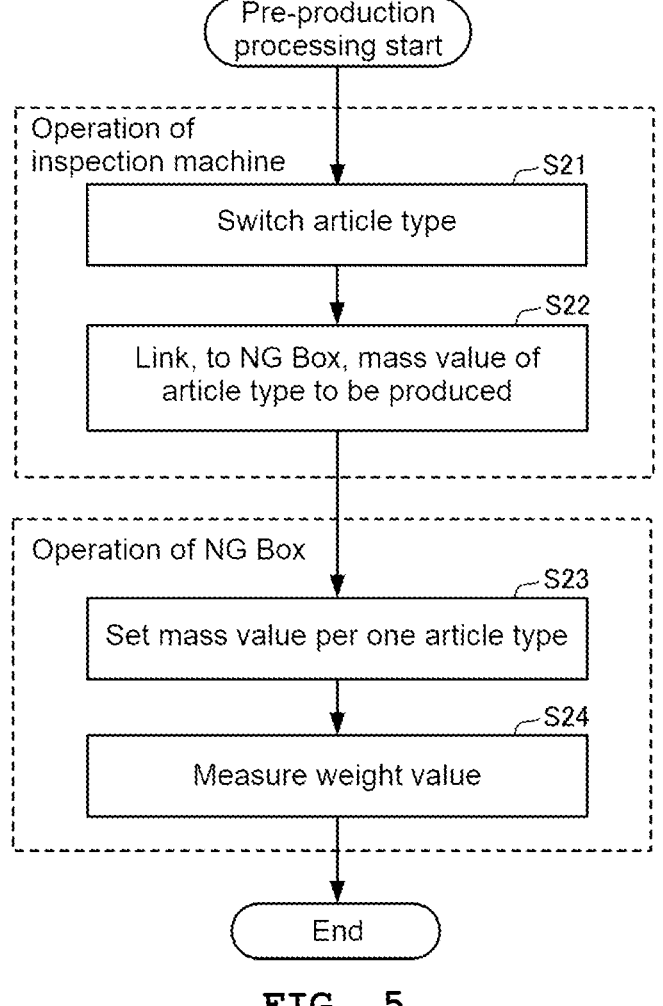
FIG. 5 is a flowchart showing a general processing procedure for pre-production processing of the article inspection machine and the removed article storage box in the article inspection system according to an embodiment of the present invention.

In the mass setting processing before production (before operation of the production system) shown in FIG. 5, first, the article inspection machine 10 operates to switch a set article type of the article W to another article type of the article W according to an article type selection input by the user for setting (step S21).

Next, the controller 15 of the article inspection machine 10 transmits, to the removed article storage unit 40, the mass value of the article to be produced from now on to cause the mass value thereof to link such that the notification output unit 46 of each NG box 41 or 42 operates with the article type after the setting switching (step S22).

Next, in the notification output unit 46 of each NG box 41 or 42, under a state where the mass value per one article W of the article type after the setting switching is set and stored (step S23), the weight measuring device 45A or 45B can measure the weight of the article W stored in each NG box 41 or 42 (step S24).

Figure 6:
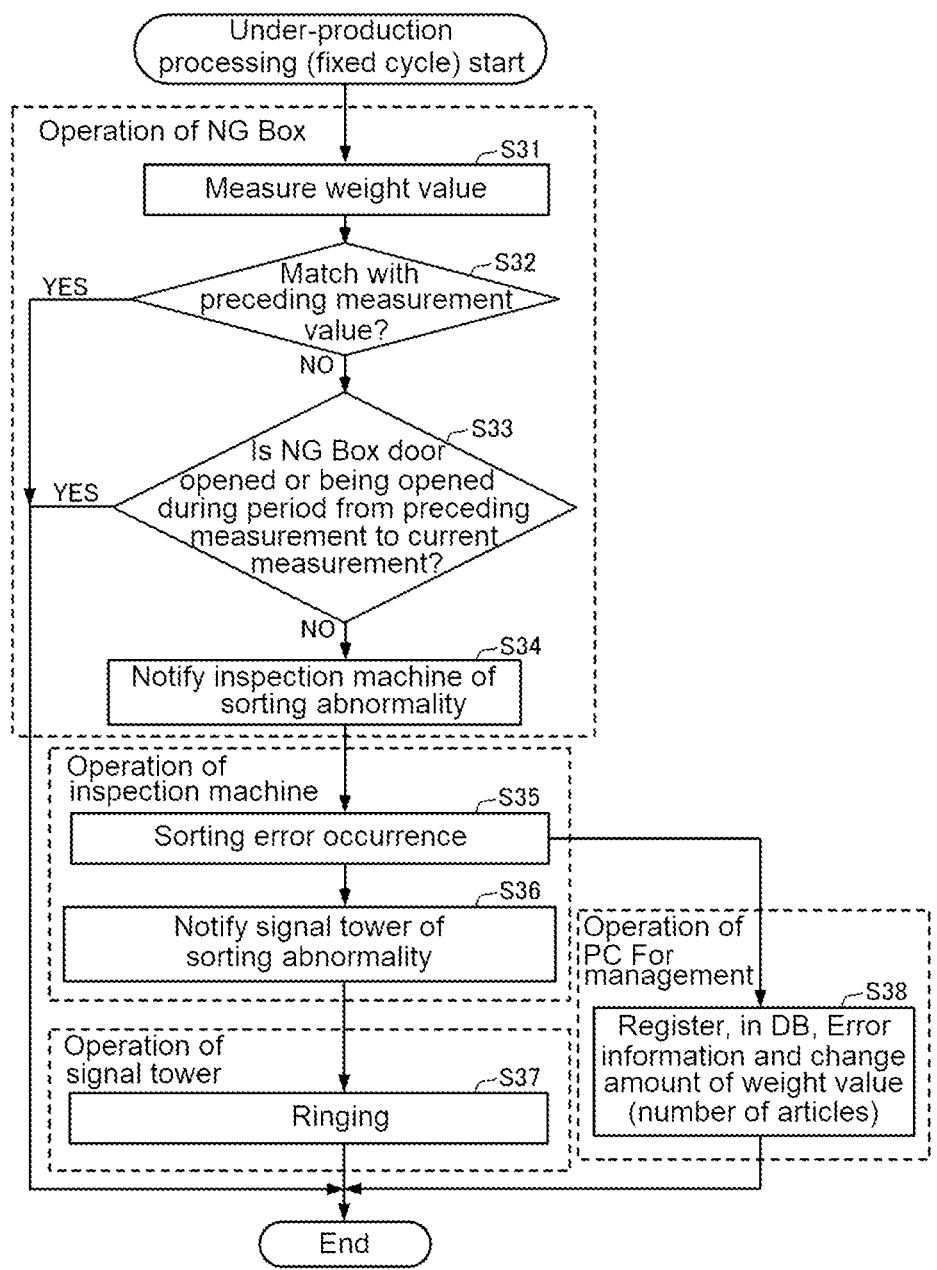
FIG. 6 is a flowchart showing a general processing procedure for under-production processing that is repeatedly executed at a fixed cycle to monitor a storage state in the removed article storage box in the article inspection system according to an embodiment of the present invention.

In the under-production processing (storage state monitoring processing executed at the fixed cycle during production) shown in FIG. 6, first, as the operation of each NG box 41 or 42, the weight measuring device 45A or 45B measures the weight value of the article W stored inside each box-shaped body 43A or 43B as the first measurement value at the preset fixed cycle (step S31).

Next, the input determination means 46*a* of the notification output unit 46 determines whether or not the immediately preceding first measurement value matches the latest second measurement value for each NG box 41 or 42 (step S32).

In a case where the immediately preceding first measurement value does not match the latest second measurement value (NO in step according to the determination result, whether the opening/closing door 41*a* or 42*a* of each NG box 41 or 42 is opened or being opened is determined based on the sensor information from the opening/closing detection sensor 41*b* or 42*b* (step S33).

In a case where the immediately preceding first measurement value matches the latest second measurement value match (YES in step S32), or in a case where the opening/closing door 41*a* or 42*a* of each NG box 41 or 42 is opened or being opened, the current processing ends.

On the other hand, in a case where the immediately preceding first measurement value does not match the latest second measurement value and the opening/closing door 41*a* or 42*a* of each NG box 41 or 42 is not opened or not being opened (NO in both steps S32 and S33), the notification output means 46*c* of the notification output unit 46 issues, to the controller 15 of the article inspection machine 10, the notification indicating that the sorting abnormality has occurred (step S34).

Next, the controller 15 of the article inspection machine 10 that has received the notification of the sorting abnormality generates sorting error information (step S35) and outputs, to the signal tower 30, the control signal including the sorting error information to control the signal tower 30 to be in the lighting display and the ringing state, which indicate failure of the distribution/removal operation by the sorting machine 20 (step S37).

Further, in the PC for management 50 that has received the sorting error information from the controller 15, the error information and a change amount of the weight value or the number of articles of the stored article W in each NG box 41 or 42 are stored in an inspection data database (step S38).

Figure 7:
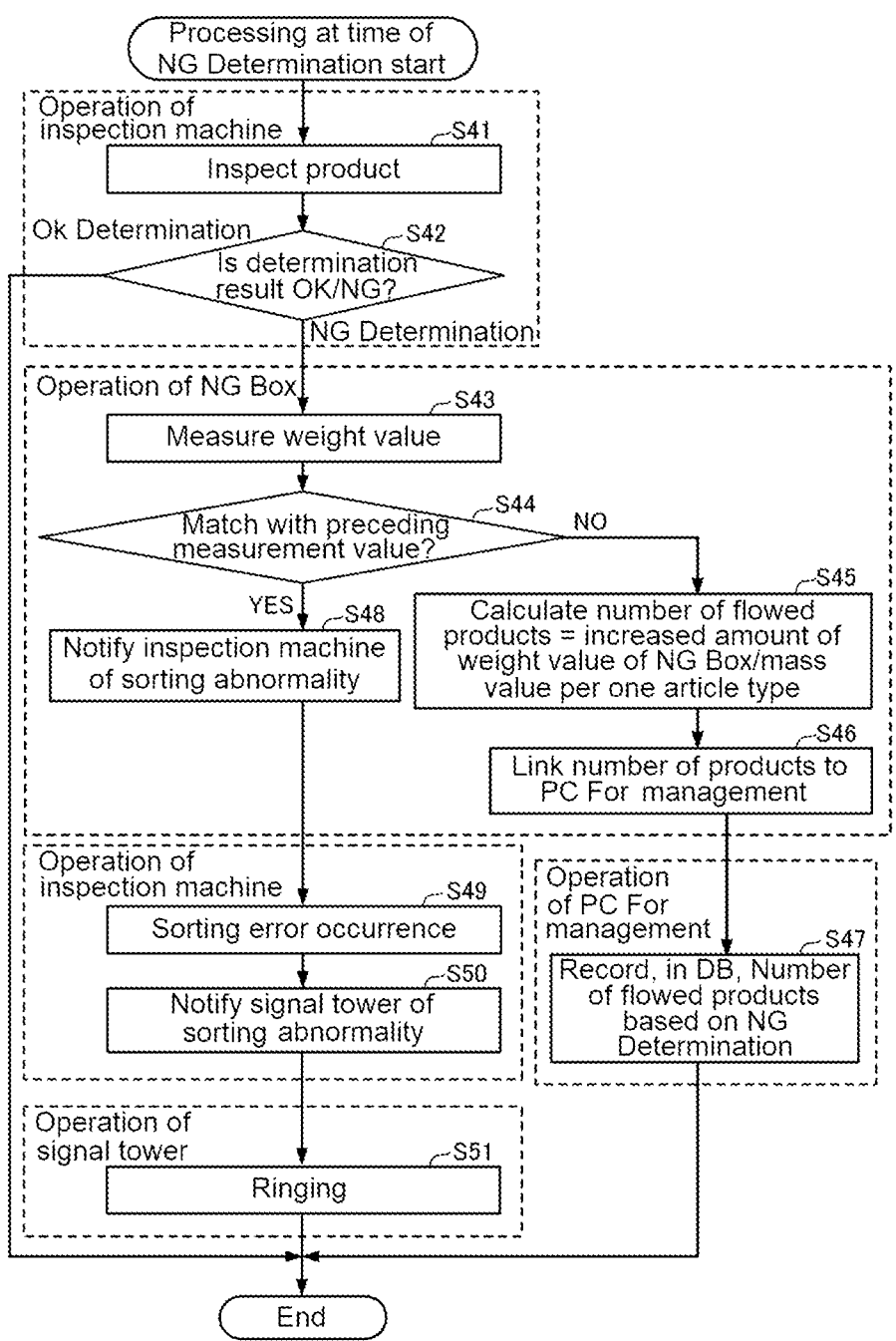
FIG. 7 is a flowchart showing a general processing procedure for NG determination timing processing at the time of NG determination that is executed in a case where an inspection result is an NG determination for product quality in the article inspection system according to an embodiment of the present invention.

In NG determination timing processing (input amount detection processing at a time of NG determination) shown in FIG. 7, first, the article inspection machine 10 operates to inspect the article W, which is a product, (step S41), and next, check whether the determination result is an OK determination or an NG determination (step S42). In a case where the determination result is OK, the current processing ends.

On the other hand, in a case where the determination result is an NG determination (specific determination result), next, each of the weight measuring devices 45A and 45B measures the weight value of the article W stored inside each box-shaped body 43A or 43B, as the latest second measurement value, at a time at which the predetermined time elapses until the completion of sorting and removal after the NG determination is made for the article Wng (step S43).

Next, the input determination means 46a of the notification output unit 46 determines whether or not the immediately preceding first measurement value matches the latest second measurement value for each NG box 41 or 42 (step S44).

In this case, in a case where the immediately preceding first measurement value does not match the latest second measurement value for the first or second NG box 41 or 42 whose weight is required to be increased due to the distribution/removal of the articles to be removed (NO in step S44), the input determination means 46a determines that the removal is successful, and the number calculation means 46b of the notification output unit 46 calculates the increased amount (=second measurement value−first measurement value) of the weight value from the immediately preceding first measurement value to the latest second measurement value and calculates the number of articles newly input into the box-shaped body 43A or 43B from the calculated value of the increased amount thereof (step S45).

Next, information on the change in the number of articles stored in the first or second NG box 41 or 42 whose mass has increased is transmitted to the PC for management 50 to update the number of articles stored in each of the NG boxes 41 and 42 monitored by the PC for management 50. Thus, information on the number of articles stored in each box-shaped body 43A or 43B is linked between the PC for management 50 and each NG box 41 or 42 (step S46).

Next, the PC for management 50 operates to store the number of articles W (denoted as "number of products" in FIG. 7) that is actually distributed and removed based on the NG determination of the article inspection machine 10 in the inspection data database (step S47).

On the other hand, in a case where the immediately preceding first measurement value matches the latest second measurement value for the first or second NG box 41 or 42 whose weight is required to be increased due to the distribution/removal of the articles to be removed (YES in step S44), the input determination means 46a determines that the removal has failed, and the notification output means 46c of the notification output unit 46 issues, to the controller 15 of the article inspection machine 10, the notification indicating that the sorting abnormality, which results in a mistake in removing the article with NG determination (a state where there is a possibility that the article with NG determination may flow to the non-defective article passing side due to the removal failure), has occurred (step S48).

Next, the controller 15 of the article inspection machine 10 that has received the notification of the sorting abnormality generates sorting error information (step S49) and outputs, to the signal tower 30, the control signal including the sorting error information (step S50) to control the signal tower 30 to be in the lighting display and the ringing state, which indicate failure of the distribution/removal operation by the sorting machine 20 (step S51).

Figure 8:
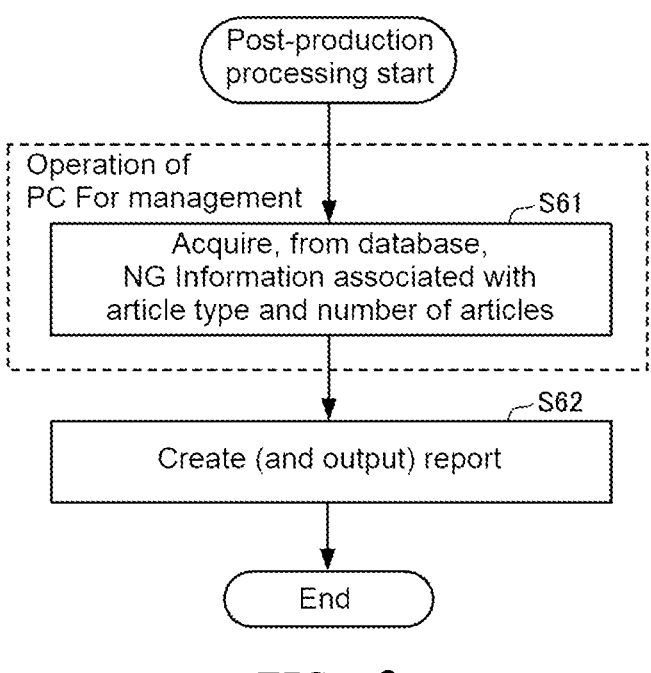
FIG. 8 is a flowchart showing a general processing procedure for post-production processing for report creation in the article inspection system according to an embodiment of the present invention.

In the post-production processing (report creation processing after production) shown in FIG. 8, the PC for management 50 operates to acquire, from the database, the information on the NG determination associated with the article type of article W and the number of removed articles based on the information (step S61) and to create a report of the inspection result based on data acquired during a preset monitoring period (for example, monitoring period for each fixed time during production) (step S62).

Figure 9A:
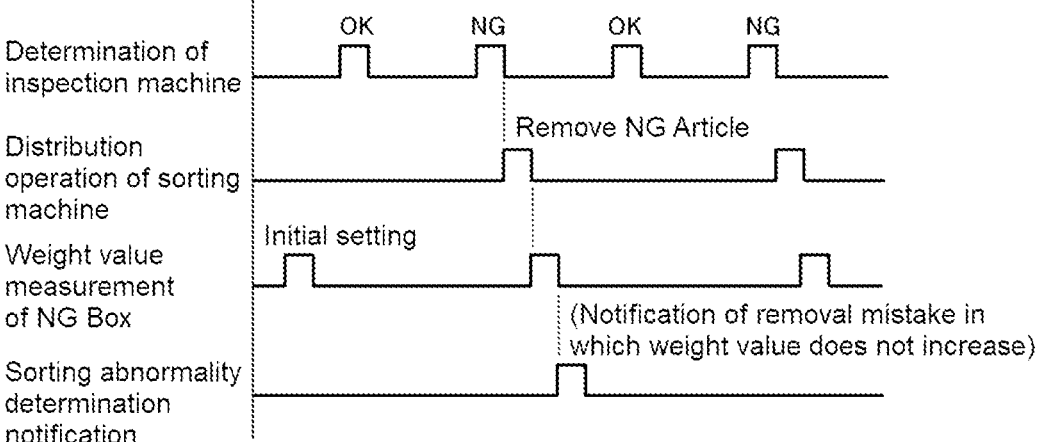
FIGS. 9A and 9B are time charts showing an operation timing of each part in the article inspection system according to an embodiment of the present invention.
Figure 9B:
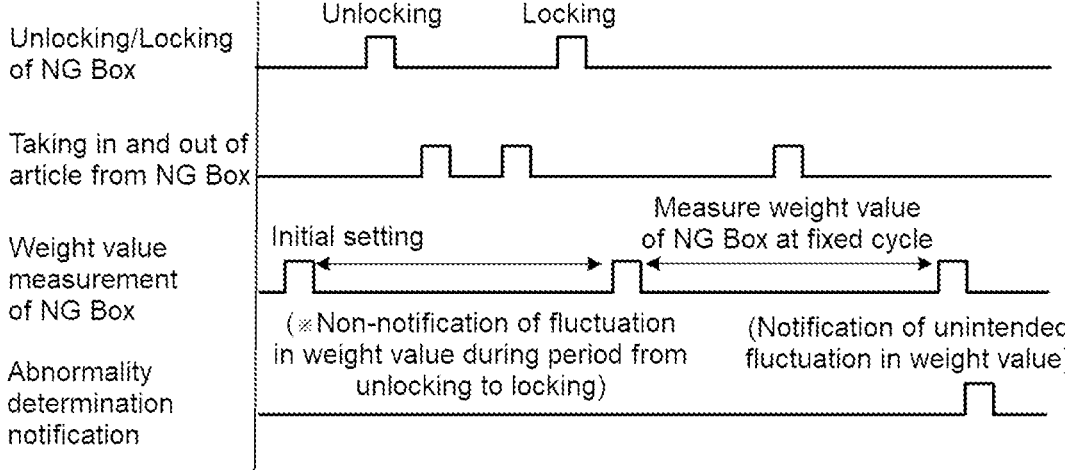

With the execution of the pieces of processing described above, in the article inspection system 1 of the present embodiment, for example, as shown in FIGS. 9A and 9B, in a case where the inspection result by the article inspection machine 10 is the NG determination, the weight value of the stored article W in the first or second NG box 41 or 42 corresponding to the distribution/removal direction is measured early after the distribution/removal of the NG article by the sorting machine 20 to be set as the latest second measurement value. While the inspection result by the article inspection machine 10 is the OK determination, the weight value of the article W stored in each NG box 41 or 42 is measured at the fixed cycle to be stored in the memory as the first measurement value.

Further, in a case where the sorting abnormality of the removal mistake has occurred in which the weight value of the stored article W in the first or second NG box 41 or 42 corresponding to the distribution/removal direction does not increase even though the inspection result by the article inspection machine 10 is the NG determination and the sorting machine 20 performs the distribution/removal operation for the NG article, the determination notification of the sorting abnormality is issued from the notification output unit 46 of the first or second NG box 41 or 42.

On the other hand, in a case where an unintended fluctuation in the weight value has occurred, such as a change in the weight value of the stored article W in the first or second NG box 41 or 42, even though the inspection result by the article inspection machine 10 is the OK determination and the sorting machine 20 does not perform the distribution/removal operation for the NG article, the abnormality determination notification with a concern about unauthorized extraction or the like is issued from the notification output unit 46 of the first or second NG box 41 or 42.

During a period from opening (unlocking that unlocks key in the illustrated example) of the opening/closing door 41a or 42a of the first or second NG box 41 or 42 until closing (locking that locks key in the illustrated example) thereof, the change in the weight value thereof is treated as a normal operation such as taking out a removed article, rather than the unintended fluctuation in the weight value. Therefore, no abnormality determination notification is issued from the notification output unit 46.

In the present embodiment, which operates as described above, it is possible to store the article W removed to the outside of system from the article inspection line inside any one of the removed article storage box 41 or the removed article storage box 42 corresponding to the distribution/removal direction, and to monitor the presence or absence of the change in the stored numerical quantity or the change amount in the removed article storage unit 40 such that information can be output accurately. As a result, it is possible to reliably match the output information of the inspection results of the article inspection machine 10 with the change in the storage state of the removed article in each NG box 41 or 42, and to quickly and easily check the number of NG occurrences or the like in both the article inspection machine 10 and the PC for management 50.

That is, in each NG box 41 or 42, which is the removed article storage box of the present embodiment, the weight value of the article W stored in the box-shaped body 43A or 43B is measured as the first measurement value at the fixed cycle, which means that the weight value thereof is substantially always monitored, and in a case where the inspection result by the article inspection machine 10 is the NG determination (specific inspection result) and the removal is necessary, it is possible to determine whether or not the article Wng with the NG determination is input into the box-shaped body 43A or 43B within the predetermined time after the distribution/removal operation based on a request to remove the article Wng with comparison of the second measurement value at the time at which the predetermined time is elapsed after the distribution/removal with the first measurement value before the removal request is generated.

Therefore, it is accurately determined, based on the first and second measurement values, whether or not the article Wng with the inspection result of the NG determination is input from the conveyor transport path 4 into the box-shaped body 43A or 43B within the predetermined time after the distribution/removal. As a result, each NG box 41 or 42 is the removed article storage box capable of storing the article W removed to the outside of system from the article inspection line inside the removed article storage box and of monitoring the state change in the stored numerical quantity of the article W or the like such that notification can be output accurately. Further, it is possible to reliably match the output information of the inspection results of the article inspection machine 10 with the change in the stored numerical quantity of the removed article in each NG box 41 or 42, and to quickly and easily check the number of NG occurrences or the like.

Furthermore, in the present embodiment, in a case where the input determination means 46a determines that the article Wng with the NG determination is input into the box-shaped body from the conveyor transport path 4 within the predetermined time after the distribution/removal thereof, the number calculation means 46b can calculate the number of articles input into the box-shaped body 43A or 43B based on the increased amount of the weight value from the first measurement value to the second measurement value.

In addition, it is preferable that the weight measuring device 45A or 45B of each NG box 41 or 42 measures the second measurement value until a point in time at which the predetermined time is elapsed after the article W is determined to be NG and is sorted and removed. It is also possible to measure the second measurement value at a time at which the measurement timing of the first measurement value at the fixed cycle is reached.

In the present embodiment, the specific inspection result is the inspection result of the NG determination determined to be defective for the preset inspection item. It goes without saying that the specific inspection result is not limited to the defective determination as long as the specific inspection result is a determination result that may be distributed to a specific distribution destination among a plurality of distribution destinations. Further, the term "removal" as used in the present invention means distributing, by the sorting machine 20, to the outside of the transport path of the article to be non-removed to perform discharging to the outside of system, and may mean classifying of the articles W removed to the outside of system into a rank different from others in terms of weight, size, or the like within the allowable range.

More specifically, for example, in a case where there is an abnormality in transport, such as an early carrying in, into the inspection zone Z1, of any article preceding or succeeding the article W in the inspection zone Z1 of the inspection during the article inspection or a delayed carrying out, from the inspection zone Z1, of the article, so-called double-loading may occur on a weighing platform in the weighing inspection means 12c of the article inspection machine 10 that weighs the article W being transported.

In that case, the preceding article W cannot be weighed normally and has the NG determination due to the double-loading, but quality of the determination result for the succeeding article may be different also depending on the transport interval between the preceding article W and the succeeding article. As a result, a state may occur in which the preceding and succeeding articles W are distributed and removed as one lump without any determination for the succeeding article.

On the contrary, in the present embodiment, since a total weight or number of articles W stored in each NG box 41 or 42 is necessarily checked during the distribution/removal operation by the sorting machine 20, it is possible to quickly and accurately check the storage situation of the removed article and to quickly and accurately feed back, to the controller 15 of the article inspection machine 10 and the PC for management 50, the occurrence of the sorting abnormality and the presence or absence or amount of the change in the weight or number of stored articles of the article W in the NG box 41 or 42 corresponding to the distribution/removal direction at the time of the occurrence thereof. Therefore, it is possible to reliably prevent the number of NG articles for each inspection item on the display screen of the operation display unit 14 from becoming inconsistent with the number of articles W input into and stored in each NG box 41 or 42.

As a result, the manager does not have to interview a field worker or to check a situation at the time of removal of the NG article from a video of the NG article captured by a camera as in the related art, and it is possible to reduce the time and effort for the situation check work at the time of the NG occurrence.

Further, even though, for example, a malfunction of the sorting machine occurs due to a setting adjustment mistake or a failure, or a work mistake occurs, such as accidental returning of the removed article that has been removed from the storage box to a non-defective article passing side by a field worker for some reason, there is no mismatch between the number of NG articles and the number of articles in the NG box 41 or 42, and it is possible to ensure that the NG article is reliably removed to the outside of system.

Furthermore, the removed article storage unit 40 is stationary and is not easily affected by the flow of the article W on the conveyor transport path 4 or the distribution/removal operation of the sorting machine 20, which enables stable measurement of the storage amount. Moreover, there is no need to provide a mechanism such as a sorting checking function of detecting the NG article, which is a removal target article, according to the inspection result by using a sensor such as a light emitter/receiver or a camera to prevent the NG article from passing through the non-defective article passing side, and it is possible to easily realize the checking function.

As described above, according to the present embodiment, it is possible to provide the removed article storage box such as the NG box 41 or 42 that stores the article W removed from the article inspection line to the outside of system and monitors the stored numerical quantity of the article or a change in the numerical quantity such that information can be output accurately, and to provide the article inspection system 1 that is provided with the article inspection machine 10 and the removed article storage box thereof and is capable of accurately grasping the numerical quantity of the removed article stored in the removed article storage box and the change in the numerical quantity thereof.

In the article inspection machine 10, the plurality of pieces of inspection means are not limited to those of the exemplified inspection method, and may be, for example, inspection means for determining the quality according to a preset inspection condition for the inspection items such as the shape and size of the article W, the number of contents, a packaging state, and the presence or absence of a foreign object, based on an X-ray transmission image obtained by emitting an X-ray to the article W transported by the conveyor transport path 4. Further, in one embodiment, the sorting machine 20 with the sorting and removal method using the flipper arm is employed, but it is needless to say that other sorting and removal methods such as an up-out discharging method, a drop-down method, a shuttle method, or a chute method may be employed. Furthermore, in the article inspection system 1 of one embodiment, the controller 15 including the PLC is provided in the article inspection machine 10, but the PLC may be provided outside the article inspection machine 10. Further, in one embodiment, a case is illustrated in which the sorting machine 20 having the pair of left and right flipper arms as the sorting arms 21 and 22 is installed at the rear stage of the article inspection machine 10, but a system configuration may be employed, which includes a distribution mechanism having a plurality of pairs of flipper arms as the sorting arms 21 and 22 in which each pair of flipper arms is spaced apart in the article transport direction and a plurality of pairs of removed article storage boxes corresponding to the flipper arms.

As described above, in the present invention, it is possible to provide the removed article storage box that stores the article removed from the article inspection line to the outside of system and monitors the state changes in the stored numerical quantity of the article and the like such that information can be output accurately and provide the article inspection system that is provided with the article inspection machine and the removed article storage box thereof and can accurately grasp the numerical quantity of the removed article stored in the removed article storage box and the change in the numerical quantity thereof. The present invention is useful in general for a removed article storage box into which, in a case where an inspected article with a specific inspection result is removed from an article transport path, the article to be removed is input and an article inspection system equipped with the box.

DESCRIPTION OF REFERENCE NUMERALS
AND SIGNS

1: article inspection system
2, 3, 4, 5: conveyor transport path
6: article detection sensor
7, 8: transport drive motor
10: article inspection machine (article inspection device)
11: inspection unit
12a: metal inspection means (article inspection means)
12b: shape inspection means (article inspection means)
12c: weighing inspection means (article inspection means)
13: determination unit
14: operation display unit
14a: display unit
14b: operation unit
15: controller
16: sorting control unit
17: transport control unit
20: sorting machine (removal device, sorting device)
21, 22: sorting arm
23: distribution mechanism
24a, 24b: lever
27: drive mechanism
28: sorting drive circuit
30: signal tower
40: removed article storage unit
41: NG box (removed article storage box, first NG box)
41a, 42a: opening/closing door
41b, 42b: opening/closing detection sensor
42: NG box (removed article storage box, second NG box)
43A, 43B: box-shaped body
45A, 45B: weight measuring device (weight measuring means, weighing means)
46: notification output unit
46a: input determination means
46b: number calculation means
46c: notification output means
50: PC for management
CYL1, CYL2: air cylinder (fluid pressure operated actuator)
D0: article transport direction
D1, D2: distribution/removal direction
RJ1, RJ2: sorting command signal
V1, V2: cylinder control valve
Z1: inspection zone
Z2: sorting zone

What is claimed is:

1. A removed article storage box having a box-shaped body with a bottom inside the removed article storage box, in which, in a case where an article on a transport path with a specific inspection result is removed to an outside of the transport path, the article to be removed is input into the box-shaped body, the removed article storage box comprising:

weight measuring means for measuring a weight value of the article input into the box-shaped body and for measuring a first measurement value measured at a preset fixed cycle and a second measurement value measured at a time at which a predetermined time elapses after the article with the specific inspection result is removed to the outside of the transport path;

input determination means for determining, based on the first measurement value and the second measurement value, whether or not the article with the specific inspection result is input into the box-shaped body from the transport path within a predetermined time after the removal;

notification output means for performing a notification output of a storage state of the article in the box-shaped body according to a determination result of the input determination means; and number calculation means for calculating, based on the first measurement value and the second measurement value, the number of articles in the box-shaped body.

2. The removed article storage box according to claim 1, wherein the notification output means outputs, to an external device or an external system capable of performing a notification output, abnormality notification information that is notification information indicating an abnormality occurrence in which the article with the specific inspection result is not input into the box-shaped body within the predetermined time and/or is notification information indicating an abnormality occurrence in which an article without the specific inspection result is input into the box-shaped body, and/or notification information corresponding to the number of input articles.

3. The removed article storage box according to claim 1, wherein the specific inspection result is an inspection result determined to be defective for a preset inspection item, and the article with the specific inspection result is removed to the outside of the transport path as a defective article to be removed and is input into the box-shaped body.

4. An article inspection system comprising:

an article inspection machine that inspects an article on a transport path for a predetermined inspection item;

a removal device that removes, in a case where an inspection result of the article inspection machine is a specific inspection result, an inspected article to an outside of the transport path as an article to be removed; and the removed article storage box according to claim 1 that stores the article removed to the outside of the transport path by the removal device.

5. The article inspection system according to claim 4, wherein the weight measuring means of the removed article storage box measures the second measurement value at a time at which a predetermined time is elapsed after the article is removed to the outside of the transport path by the removal device and until a measurement timing of the first measurement value at the fixed cycle is reached.

6. The article inspection system according to claim 4, wherein the notification output means of the removed article storage box outputs, to an external device or an external system capable of performing a notification output, abnormality notification information that is notification information indicating an abnormality occurrence in which the article with the specific inspection result is not input into the box-shaped body within the predetermined time and/or is notification information indicating an abnormality occurrence in which an article without the specific inspection result is input into the box-shaped body, and/or notification information corresponding to the number of input articles.

7. A removed article storage box having a box-shaped body with a bottom inside the removed article storage box, in which, in a case where an article on a transport path with a specific inspection result is removed to an outside of the transport path, the article to be removed is input into the box-shaped body, the removed article storage box comprising:

weight measuring means for measuring a weight value of the article input into the box-shaped body and for measuring a first measurement value measured at a preset fixed cycle;

input determination means for determining, based on the first measurement value, whether or not the article with the specific inspection result is input into the box-shaped body from the transport path within a predetermined time after the removal;

notification output means for performing a notification output of a storage state of the article in the box-shaped body according to a determination result of the input determination means; and number calculation means for calculating, based on the first measurement value, the number of articles in the box-shaped body.

8. The removed article storage box according to claim 7, wherein the notification output means outputs, to an external device or an external system capable of performing a notification output, abnormality notification information that is notification information indicating an abnormality occurrence in which the article with the specific inspection result is not input into the box-shaped body within the predetermined time and/or is notification information indicating an abnormality occurrence in which an article without the specific inspection result is input into the box-shaped body, and/or notification information corresponding to the number of input articles.

9. The removed article storage box according to claim 7, wherein the specific inspection result is an inspection result determined to be defective for a preset inspection item, and the article with the specific inspection result is removed to the outside of the transport path as a defective article to be removed and is input into the box-shaped body.

10. An article inspection system comprising:

an article inspection machine that inspects an article on a transport path for a predetermined inspection item;

a removal device that removes, in a case where an inspection result of the article inspection machine is a specific inspection result, an inspected article to an outside of the transport path as an article to be removed; and the removed article storage box according to claim 2 that stores the article removed to the outside of the transport path by the removal device.

11. The article inspection system according to claim 10, wherein the notification output means of the removed article storage box outputs, to an external device or an external system capable of performing a notification output, abnormality notification information that is notification information indicating an abnormality occurrence in which the article with the specific inspection result is not input into the box-shaped body within the predetermined time and/or is notification information indicating an abnormality occurrence in which an article without the specific inspection result is input into the box-shaped body, and/or notification information corresponding to the number of input articles.

* * * * *